United States Patent
Schrod

(10) Patent No.: US 6,661,155 B2
(45) Date of Patent: Dec. 9, 2003

(54) METHOD AND DEVICE FOR CONTROLLING AT LEAST ONE CAPACITIVE ACTUATOR

(75) Inventor: Walter Schrod, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/265,840

(22) Filed: Oct. 7, 2002

(65) Prior Publication Data

US 2003/0164160 A1 Sep. 4, 2003

Related U.S. Application Data

(63) Continuation of application No. PCT/DE01/01335, filed on May 4, 2001.

(51) Int. Cl.[7] .............................................. H01L 41/08
(52) U.S. Cl. .............. 310/316.01; 310/317; 310/316.03
(58) Field of Search ................. 310/316.01, 316.03, 310/317, 319

(56) References Cited

U.S. PATENT DOCUMENTS 6,198,199 B1 * 3/2001 Hoffmann et al. ...... 310/316.03
6,441,535 B2 * 8/2002 Freudenberg et al. ... 310/316.03

FOREIGN PATENT DOCUMENTS

| DE | 19632872 A1 | 2/1998 | ............ F02D/41/20 |
| --- | --- | --- | --- |
| DE | 19652801 C1 | 4/1998 | ............ H02N/2/00 |
| DE | 19714607 A1 | 10/1998 | ............ H02N/2/06 |
| DE | 19805184 A1 | 8/1999 | ............ G01K/7/34 |
| DE | 19944734 A1 | 4/2001 | ............ H02N/2/02 |

OTHER PUBLICATIONS

Patent Abstracts of Japan vol. 015, No. 057 (M–1080), Feb. 12, 1991 & JP 02 286852 A (Toyota Motor Corp.), Nov. 27, 1990 Zusammenfassung.

* cited by examiner

*Primary Examiner*—Mark Budd
(74) *Attorney, Agent, or Firm*—Baker Botts L.L.P.

(57) ABSTRACT

A capacitive actuator element, in particular of a fuel injection valve of an internal combustion engine, is charged with different charging times. In order to shorten the charging time, the charging oscillatory circuit is switched over to a freewheeling circuit, and in order to prolong the charging time, switching back from the freewheeling circuit to the charging circuit takes place, it being possible to switch backwards and forwards repeatedly between the freewheeling circuit and charging circuit.

14 Claims, 1 Drawing Sheet

METHOD AND DEVICE FOR CONTROLLING AT LEAST ONE CAPACITIVE ACTUATOR

CROSS REFERENCE TO RELATED APPLICATION

This application is a continuation of copending International Application No. PCT/DE01/01335 filed May 4, 2001, which designates the United States.

BACKGROUND OF THE INVENTION

The invention relates to a method for actuating at least one capacitive actuator element, in particular a fuel injection valve of an internal combustion engine. The invention also relates to a device for carrying out this method.

When a capacitive actuator element is actuated by means of resonant output stages—the capacitances of the charging capacitors and of the actuator element form an oscillatory circuit with the inductance of the recharging coil—the power components which form the oscillatory circuit and their tolerances have a large influence on the charging and discharging times of the actuator element, which leads to effects on the fuel injection quantity in the known fuel injection valves.

From the point of view of combustion technology—and in order to obtain the smallest possible fuel injection quantities—charging times which are as short as possible are to be aimed at but these lead to high noise emissions. For this reason, the charging times are regulated and short charging times are predominantly used in those operating ranges in which the noise emissions caused by them are not felt to be disruptive, for example at high engine speeds at which their sound is drowned out.

In the non-prepublished DE 199 44 734.9, in which the charging capacitor is configured for a maximum charging period, it is proposed to switch over the oscillatory circuit to a freewheeling circuit in order to shorten the charging time.

DE 196 32 872 A1 discloses a method and a device for actuating at least one capacitive actuator element which can be charged to different setpoint voltage values, which brings about a variable charging time which can be shortened by means of premature switching off, starting from a maximum charging time predefined by capacitances and inductances.

DE 196 52 801 C1 discloses a method and a device for actuating at least one capacitive actuator element which is charged with a constant amount of energy which, despite the variable actuator element capacitance which is dependent on temperature is kept constant by varying the charging voltage.

DE 198 05 184 A1 discloses a method and a device for determining a temperature of a piezoelectric actuator element, the actuator element being charged in a clocked fashion from an energy store which is supplied with energy from a voltage transformer and is also discharged again into the energy store in a clocked fashion.

SUMMARY OF THE INVENTION

The object of the invention is to specify a method for actuating a capacitive actuator element of a fuel injection valve of an internal combustion engine by means of which a variable charging time of the actuator element can be obtained. The object of the invention is also to provide a device for carrying out this method.

This object is achieved according to the invention in terms of a method for actuating at least one capacitive actuator element by means of a charging oscillatory circuit which contains the actuator element, wherein in order to bring about a variable charging time, the capacitance of the charging source is dimensioned in such a way that the resonance frequency of the charging oscillatory circuit gives rise to a predetermined, average charging time, in order to bring about a minimum charging time up to the average charging time, the flow current is switched over from the charging oscillatory circuit to a freewheeling circuit at a specific time, and in order to bring about the average charging time up to the maximum charging time, the flow of current is switched over from the free-wheeling circuit back to the charging oscillatory circuit at a specific time.

Furthermore, the object is achieved by a device for controlling at least one capacitive actuator having a series circuit composed of a charge source composed of a charging capacitor which can be charged from a power source, and a recharging capacitor, a charging switch, a first diode, a recharging coil and the actuator element, and having a discharging switch which connects the connection point for the first diode and recharging capacitor to ground, and a controlled circuit which controls the charging and the discharging switches via a second diode, wherein a series circuit of a third diode and of a freewheeling capacitor leads from the connecting point between the second diode and discharging switch to the connecting point between the recharging capacitor and recharging coil.

The discharging switch may be bypassed by a diode which conducts current in the direction of the second diode. The device may further comprise a series circuit composed of fourth and fifth diodes, which conduct current in the direction of their connecting point, that is connected in parallel with the freewheeling capacitor. Furthermore, a discharging switch which is switched on and off in synchronism with the discharging switch may be arranged between the connecting point of the fourth and fifth diodes and the charging capacitor.

The method according to the invention consists in the fact that, in order to achieve variable charging times, the current flowing in the primary resonance circuit during the charging operation of the capacitive actuator element is redirected into a freewheeling circuit in order to variable the charging time, as a result of which the charging operation is significantly shortened. In order to prolong the charging time, firstly the current flowing in the primary resonant circuit is redirected into the freewheeling circuit and then the primary charging circuit is switched on again as long as current is still flowing in the freewheeling circuit. In this way, the charging time can be divided into two or more phases in which the primary oscillator circuit and the freewheeling circuit are alternatively switched on, as a result of which the charging time is prolonged.

The device according to the invention also has the advantage of making possible protection against short circuiting and personal protection. This is significant as the output of the actuator circuit can be connected directly to high intermediate voltages, for example 80V, and is connected to the cable set of the internal combustion engine in which a short circuit cannot be ruled out.

An exemplary embodiment of a device for carrying out the method according to the invention is explained in more detail below with reference to the schematic drawing, in which.

Figure 1:
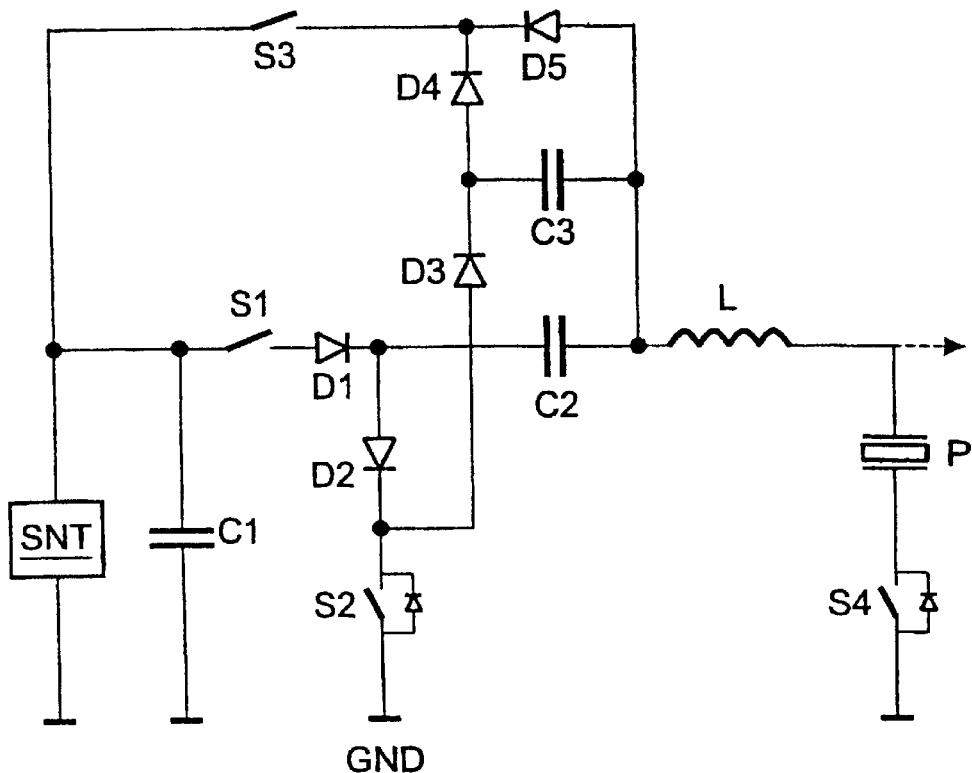
FIG. 1 shows the circuit of an exemplary embodiment.

FIG. 1 shows a basic circuit of a device according to the invention for actuating a capacitive actuator element P of a fuel injection valve of an internal combustion engine. Said circuit is composed of a series connection, connected to ground GND (reference potential) at both ends, of a charge source, here of a charging capacitor C1 which can be charged by a power source SNT, of a charging circuit S1, of a first diode D1, of a recharging capacitor C2, or a recharging coil L and of one or more series connections which are connected in parallel with one another and are each composed of an actuator element P and a selector switch S.

The connection of the recharging capacitor C2 to the charging switch S1 can be connected to ground GND via a discharging switch S2 which is connected in series with a second diode D2.

This second diode D2 conducts current in the direction of ground GND.

The two switches S1 and S2 as well as further switches (mentioned later) are controlled by a control circuit ST (not illustrated). If charging, discharging or selector switches are referred to, preferably thyristors or MOSFETs are to be understood.

A series connection of a third diode D3 and of a freewheeling capacitor C3 leads from the connecting point between the second diode D2 and discharging switch S2 to the connecting point between the recharging capacitor C2 and recharging coil L. A series connection of a fourth and fifth diode D4, D5, which conduct current in the direction of their connecting point is connected in parallel with the freewheeling capacitor C3. A further discharging switch S3, which is switched on and off in synchronism with the discharging switch S2 is arranged between this connecting point and the charging capacitor C1.

The capacitance of the charging capacitor C1 may be assumed to be significantly greater than the capacitance of the recharging capacitor C2 and of the freewheeling capacitor C3, C2 and C3 being approximately of equal magnitude, i.e. C2 can be smaller, equal to or greater than C3:

$$C1 \gg C2, C3; C2 C3.$$

The capacitors C1 and C2 are dimensioned for an average charging time which is between a minimum and maximum achievable time.

Under initial conditions of this circuit, the charging capacitor C1 and the recharging capacitor C2 are assumed to be fully charged, while the freewheeling capacitor C3 is assumed to be discharged. All the switches are nonconductive.

Figure 2:
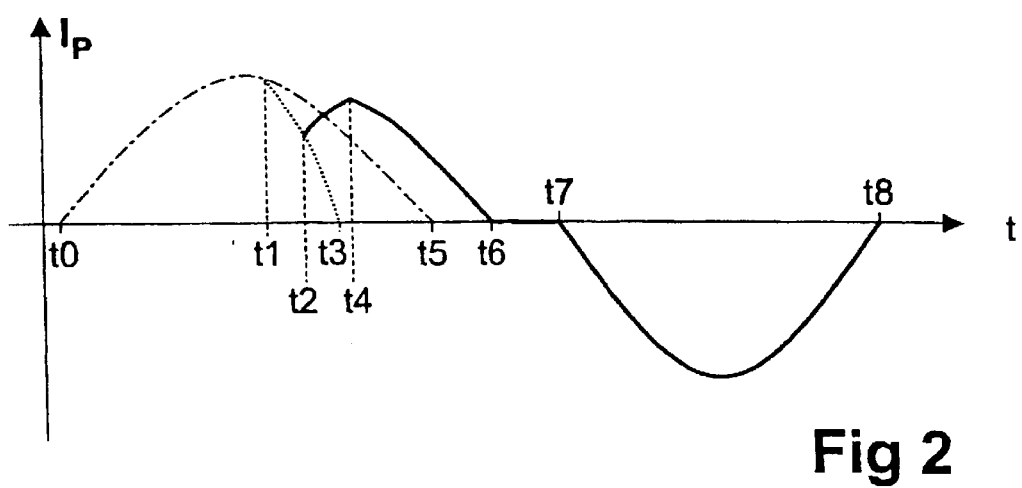
FIG. 2 shows a diagram of the charging and discharging currents.

FIG. 2 shows the profile of the current $I_p$ flowing through the actuator element during a charging operation and a discharging operation.

An actuator element P is charged by switching on the actuator S1 and the selection switch S4, assigned to the actuator element, at the time t0 (FIG. 2). Here, the charge oscillates from the series-connected capacitors C1 and C2 with a current $I_p$ in the form of a half sinusoidal oscillation (dot-dashed curve in FIG. 2) and from these two capacitors to the actuator element P via the recharging coil L. In this time, the charging time, the actuator element voltage rises to a specific value, and the actuator element P opens the fuel injection valve.

If the current $I_p$ becomes zero at the time t5, the charging circuit S1 becomes not conductive again and the actuator element voltage is maintained at the start of a discharging operation. The charging time was t5–t0. The freewheeling capacitor C3 is still discharged.

In order to achieve a shorter to minimum charging time, the charging circuit S1 is prematurely switched off at the time t1. As a result, the charge contained at that particular time in the recharge capacitor C2 remains constant, and the flow of the current $I_p$ which continues to flow through the recharging coil L is connected back to the recharging coil L via the actuator element P, the selector switch S4, the inverse diode of the discharging switch S2, the third diode D3 and the freewheeling capacitor C3, as a result of which the current $I_p$ (dotted curve) drops quickly and already becomes zero at the time t3. As a result of the firstly uncharged freewheeling capacitor C3 in which the part of the energy stored in the recharging coil L which is not stored in the actuator element P is buffered, an oscillatory circuit is obtained with a different, smaller time constant which can be influenced by the capacitance of the further capacitor C3. As a result, the charging time t3–t0 of the actuator element ends more quickly.

In the case of recharging times with switching over to the freewheeling capacitor C3 which are nearest the time t5–t0 (without switching over the capacitor C3), reversal of the polarity of the recharging capacitor C2 may occur. The capacitor C3 is also charged via the diodes D2 and D3. When the actuator element P is discharged, it is thus impossible for a compensating current to flow between the capacitors C2 and C3.

If, on the other hand, the charging time is to be prolonged, the charging switch S1 is switched on again during the freewheeling operation, for example at the time t2. The current IP flows again from the charging capacitor C1 to the actuator element via the recharging capacitor C2 and the recharging coil L. If said current becomes zero at the time t6, the charging process is thus terminated.

By repeatedly switching over from the charging circuit to the freewheeling circuit and back again, the charging time can be significantly prolonged in this way, i.e. varied in a relatively large range up to a maximum charging time. In the case of fuel injection valves which are used in diesel engines, it is not appropriate to switch over more than twice, but switching over more than twice can easily be implemented in other applications.

When the actuator element P is discharged, starting at the time t7, the discharging switch S2 is switched on, as is the further discharging switch S3 in synchronism with it. As a result, the actuator element P is firstly discharged into the recharging capacitor C2 via the recharging coil L until the sum of the voltages at the recharging capacitor C2 and at the freewheeling capacitor C3 reaches the voltage at the charging capacitor C1, after which the freewheeling capacitor C3 is then discharged into the significantly larger charging capacitor C1 until there is no discharging current $-I_p$ flowing any more. As a result, the discharging time is slightly prolonged and ends at the time t8.

At the end of the discharging process, the initial conditions for the next actuator element actuation are fulfilled again: the voltage at the recharging capacitor C2 is equal to the voltage at the charging capacitor C1, and the further capacity C3 is discharged.

With the circuit described, a maximum quantity of energy $$Cmax < \frac{1}{\frac{1}{C1} + \frac{1}{C2+C3}}$$

which can be stored in the series capacitor (series connection composed of C1 with the parallel connection of C2 and C3) for providing personal protection can be defined.

Emax=0.5*V$^2$*Cmax; e.g.: Emax=0.5*160$^2$V*10$\mu$F=128 mJ.

A short circuit is also limited by this available energy.

What is claimed is:

1. A method for actuating at least one capacitive actuator element by means of a charging oscillatory circuit and a freewheeling circuit for controlling a flow current through the capacitive actuator element, comprising the steps:

switching the flow current over from the charging oscillatory circuit to the freewheeling circuit at a specific time in order to bring about a minimum charging time up to the average charging time, and switching the flow current over from the free-wheeling circuit back to. the charging oscillatory circuit at a specific time in order to bring about the average charging time up to the maximum charging time.

2. The method as claimed in claim 1, wherein starting from the specific time, switching backwards and forwards between the freewheeling circuit and the charging oscillatory circuit is performed repeatedly.

3. The method as claimed in claim 1, wherein the actuator element is part of a fuel injection valve of an internal combustion engine.

4. The method as claimed in claim 1, wherein the capacitance of the charging source is selected to be significantly greater than the capacitance of the freewheeling circuit.

5. A device for controlling at least one capacitive actuator having a series circuit composed of a charge source composed of a charging capacitor which can be charged from a power source, and a recharging capacitor, a charging switch, a first diode, a recharging coil and the actuator element, and having a discharging switch which connects the connection point for the first diode and recharging capacitor to ground, and a controlled circuit which controls the charging and the discharging switches via a second diode, wherein a series circuit of a third diode and of a freewheeling capacitor leads from the connecting point between the second diode and discharging switch to the connecting point between the recharging capacitor and recharging coil, the discharging switch is bypassed by a diode which conducts current in the direction of the second diode, a series circuit composed of fourth and fifth diodes, which conduct current in the direction of their connecting point, is connected in parallel with the freewheeling capacitor, and a further discharging switch which is switched on and off in synchronism with the discharging switch is arranged between the connecting point of the fourth and fifth diodes and the charging capacitor.

6. The device as claimed in claim 5, wherein the capacitance of the charging capacitor is selected to be significantly greater than the capacitance of the recharging capacitor and of the freewheeling capacitor, and the capacitance of the recharging capacitor corresponds in magnitude to the capacitance of the freewheeling capacitor.

7. The device as claimed in claim 5, wherein the actuator element is part of a fuel injection valve of an internal combustion engine.

8. A device for controlling at least one capacitive actuator having a series circuit composed of a charge source composed of a charging capacitor which can be charged from a power source, and a recharging capacitor, a charging switch, a first diode, a recharging coil and the actuator element, and having a discharging switch which connects the connection point for the first diode and recharging capacitor to ground, and a controlled circuit which controls the charging and the discharging switches via a second diode, wherein a series circuit of a third diode and of a freewheeling capacitor leads from the connecting point between the second diode and discharging switch to the connecting point between the recharging capacitor and recharging coil.

9. The device as claimed in claim 8, wherein the discharging switch is bypassed by a diode which conducts current in the direction of the second diode.

10. The device as claimed in claim 9, wherein a series circuit composed of fourth and fifth diodes, which conduct current in the direction of their connecting point, is connected in parallel with the freewheeling capacitor.

11. The device as claimed in claim 10, wherein a further discharging switch which is switched on and off in synchronism with the discharging switch is arranged between the connecting point of the fourth and fifth diodes and the charging capacitor.

12. The device as claimed in claim 11, wherein the capacitance of the charging capacitor is selected to be significantly greater than the capacitance of the recharging capacitor and of the freewheeling capacitor.

13. The device as claimed in claim 12, wherein the capacitance of the recharging capacitor corresponds in magnitude to the capacitance of the freewheeling capacitor.

14. The device as claimed in claim 8, wherein the actuator element is part of a fuel injection valve of an internal combustion engine.

* * * * *

UNITED STATES PATENT AND TRADEMARK OFFICE
CERTIFICATE OF CORRECTION

PATENT NO.   : 6,661,155 B2
DATED        : December 9, 2003
INVENTOR(S)  : Schrod It is certified that error appears in the above-identified patent and that said Letters Patent is hereby corrected as shown below:

<u>Title page,</u>
Item [63], Related U.S. Application Data, please delete "May 4, 2001" and replace with -- April 5, 2001 --

Signed and Sealed this

Fifth Day of April, 2005

JON W. DUDAS
*Director of the United States Patent and Trademark Office*